Feb. 25, 1964  R. P. RUFER  3,122,648
VERNIER CHRONOTRON UTILIZING AT LEAST TWO SHORTED DELAY LINES
Filed Aug. 31, 1960

INVENTOR.
RICHARD P. RUFER
BY
*Roland A. Anderson*
ATTORNEY

United States Patent Office
3,122,648
Patented Feb. 25, 1964

3,122,648
VERNIER CHRONOTRON UTILIZING AT LEAST
TWO SHORTED DELAY LINES
Richard P. Rufer, Castro Valley, Calif., assignor to the United States of America as represented by the United States Atomic Energy Commission
Filed Aug. 31, 1960, Ser. No. 53,324
7 Claims. (Cl. 307—88.5)

The present invention relates generally to vernier chronotron circuitry and more particularly to a regenerative pulse amplifier and coincidence circuit embodied in a vernier chronotron.

Research and experimentation in many scientific fields, notably nuclear physics, requires exceptionally fast and accurate time measuring apparatus. When attempting to observe the formation and decay of nuclear excited states it is often necessary to record time intervals as short as $10^{-9}$ seconds. One device for performing such time interval measurements is the vernier chronotron described by Harlan W. Lefevre and James T. Russell in the Review of Scientific Instruments, vol. 30, No. 3, March 1959, pp. 159–166.

In general, the vernier chronotron fundamentally comprises a coincidence circuit having two inputs and two repetitive pulse forming circuits each connected to one of the inputs. A repetitive pulse forming circuit, designated hereinafter as a regenerative pulse amplifier (RPA), is characterized by the output of a continuous series of pulses having a specified pulse width and repetition rate. In the vernier chronotron, a signal denoting the start of a time interval is used to trigger one RPA into feeding a series of pulses into the coincidence circuit. A second signal representing the end of the time interval then triggers the second RPA. By specifying the repetition rate of the second RPA to be slightly faster than that of the first RPA, the pulses from the second will in time "overtake" those put out by the first. When two coincident pulses are finally impressed upon the inputs of the coincidence circuit, a single pulse is created on the output thereof. The coincidence circuit output may then be used to stop a counter which counts the number of pulses from the first RPA. Since the pulses from each RPA can be made to approach coincidence at some specified time rate per pulse, all that is necessary to determine the time interval is to count the number of pulses which occur between the triggering of the first RPA and coincidence. The number of pulses counted in conjunction with the difference in RPA repetition periods establishes the time interval between the start and finish trigger signals. A more detailed description and analysis of the vernier chronotron operation is presented herein, infra.

From the foregoing description it is readily apparent that the RPA circuit is the core of the vernier chronotron. The time intervals measurable and the resolution of the measurements are essentially governed by the pulse widths and repetition rates of the RPA circuits.

In the vernier chronotron of the Lefevre reference, the RPA is essentially a non-inverting amplifier stage with a feedback transmission line coupled from the output thereof back into its input. Upon triggering the amplifier input a pulse is intiiated from the output into the transmission line. This pulse circulates through the transmission line until it reaches the input whereupon a new pulse is once again initiated. It is important that the amplifier deliver a large enough current pulse to sustain regeneration. A shorted stub transmission line is employed at the amplifier input to determine the pulse length while the length of the feedback transmission line establishes the duration between pulses. Once triggered, this circulating type regenerative circuit continues to yield a series of pulses until stopped by some external means. The principal elements of this conventional RPA are three EFP60 secondary emission pentodes. These tubes are used because they are fast, deliver large current pulses, and fulfill the circuit requirement for a non-inverting amplifier stage. However, these EFP60 tubes have a major drawback in that they require a 550 volt power supply for their operation. This voltage requirement restricts the circuit in flexibility as regards its being used as a portable unit. In addition to its non-portability the conventional circuit also draws a large amount of power, even while in the quiescent state before being triggered.

Now the present invention provides a novel pulse forming circuit having the desirable features of the circuit utilizing EFP60 tubes without the lack of portability and power consuming characteristics thereof. Rather than employ the circulating type regenerative circuit which is adaptable to the non-inverting EFP60 tube, the invention is based upon a "ringing" or "back and forth" type oscillatory circuit. Fundamentally, the invention is in essence a delay line which is shorted at both ends. A pulse introduced into this transmission line travels back and forth therein resulting in the ringing type oscillation. Transistor circuitry is utilized to introduce the pulse into the transmission line and also to provide reinforcement for the pulse which is continually being attenuated in its movement through the line.

As regards the coincidence circuit of the conventional vernier chronotron it too is fundamentally dependent upon vacuum tubes. In this respect it consumes standby power and is not readily made portable. In the present invention a novel transistorized coincident circuit is utilized for which no power supply whatsoever is required.

It should be noted that the RPA of the present invention finds utility other than its function in the vernier chronotron. In general, the instant RPA can be used in any system requiring a series of fast precise pulses, e.g., high speed electronic counting apparatus, high speed clock, etc.

An important advantage of the invention is that it is entirely transistorized and consequently needs only a battery power supply whereby the problem of portability is removed. The circuits are also designed to consume no power while in the quiescent state thus aiding portability by prolonging the life of the power supply. Accordingly, it is a primary object of the present invention to provide a transistorized vernier chronotron.

It is another object of the invention to provide a vernier chronotron wherein no power is consumed while in the quiescent state.

It is a further object of the invention to provide a vernier chronotron which is entirely portable.

A still further object is to provide a transistorized regenerative pulse amplifier for creating a series of electrical pulses with a specified pulse width and a specified repetition rate.

An even further object is to provide a transistorized coincidence circuit.

Other objects and advantages of the present invention will become apparent from the following specification taken in conjunction with the accompanying drawing of which:

Figure 1:
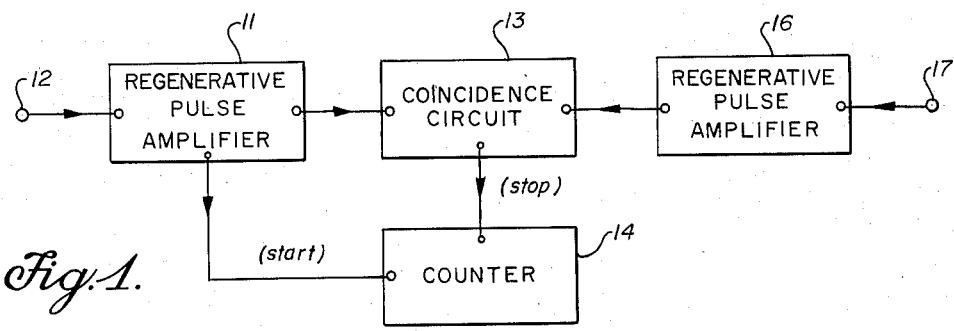
FIGURE 1 is a block diagram of a vernier chronotron system.

Referring now to the drawing there is shown in FIGURE 1 a vernier chronotron system having a regenerative pulse amplifier 11. RPA 11 has an input terminal 12 and has its output connected individually to a coincidence circuit 13 and a counter 14. The coincident circuit has its output connected to counter 14. Another RPA 16 having an input terminal 17 also feeds into coincidence circuit 13. The general configuration illustrated in FIGURE 1 is conventional and is well known in the art, however, the present invention combines a novel RPA with a novel coincidence circuit to comprise an improved and superior vernier chronotron. Before describing the over all operation of the present vernier chronotron as generally depicted in FIGURE 1, it will be more advantageous to first describe the novel components of the invention, viz., the RPA and coincidence circiuts.

Figure 2:
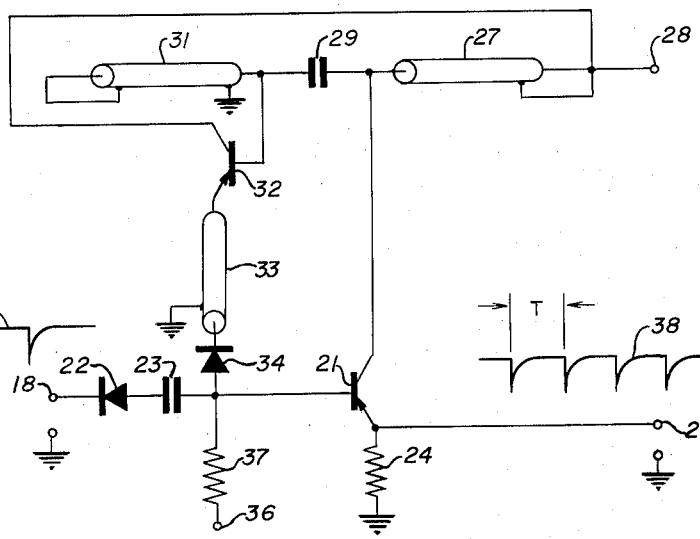
FIGURE 2 is a schematic diagram of a preferred embodiment of the instant regenerative pulse amplifier.

Referring now to FIGURE 2 there is shown a regenerative pulse amplifier according to the present invention having an input terminal 18 which receives a negative trigger pulse 19. Terminal 18 couples to the base of transistor 21 serially through a diode 22 and a capacitor 23. Diode 22 is oriented to block positive current from the input to the base of transistor 21. The emitter of transistor 21 is coupled to ground through a broadbanding resistor 24. An output terminal 26 is connected directly to the emitter of transistor 21. The collector of transistor 21 is connected to the center conductor of a coaxial delay line 27 at one end thereof. The other end of delay line 27 has its center conductor shorted to its outer shielding conductor, this end also being connected to a negative D.C. voltage supply terminal 28.

The collector of transistor 21 is coupled through a capacitor 29 to one end of a coaxial delay line 31. The other end of delay line 31 is shorted. The outer conductor of delay line 31 is grounded at its end adjacent to capacitor 29. The base of a transistor 32 is connected directly to delay line 31 at the end thereof which is connected to capacitor 29. The collector of transistor 32 is tied to the negative supply terminal 28. The emitter of transistor 32 is coupled to the base of transistor 21 serially through a coaxial delay line 33 and a diode 34. Diode 34 is oriented adjacent to transistor 21 in a manner to block a negative current from the base of transistor 21 to the emitter of transistor 32. The outer shielding wire of line 33 is grounded at its end adjacent to diode 34. The base of transistor 21 is coupled to a positive supply terminal 36 through a resistor 37. A series of negative pulses 38 having a period T appear on output terminal 26.

In operating the RPA circuit of FIGURE 2 a negative trigger pulse is received by the regenerative pulse amplifier at the input terminals thereof. This pulse is coupled through the resistance capacitive network to the base of transistor 21. The diode in the input circuit allows the capacitor thereof to charge to the peak value of the input pulse while preventing subsequent pulses of lower amplitude from disturbing the regeneration period. Transistor 21 in conjunction with its emitter resistor comprises a broadband common emitter amplifier stage which is biased through its collector at supply terminal 28 and through its base at supply terminal 36. The biasing from terminal 36 keeps the transistor cut off until properly triggered thereby preventing any power consumption while in the quiescent state. It is therefore apparent that transistor 21 is operating as a class C amplifier.

The negative input pulse upon reaching the base starts transistor 21 conducting whereby the collector voltage is raised above the level of negative supply 28. This collector output voltage starts simultaneously to travel down both delay lines 27 and 31. Line 27 is made much shorter than line 31 and consequently this shorter line determines the width of the RPA output pulse. That is, the signal traveling in line 27 upon reaching the shorted end thereof reflects this short back to the collector of transistor 21. When transistor 21 sees its collector feeding into a shorted load it is brought back into cut-off. Since the output of the RPA circuit is taken directly from the emitter of transistor 21 it is evident that this output is governed by the manner in which transistor 21 conducts. Now, as transistor 21 conducts only for the time it takes a pulse to travel back and forth in delay line 27 it is seen that the RPA output is a pulse having a wdith essentially equal to twice the delay time of line 27.

Meanwhile, after transistor 21 has been cut off, a pulse is now traveling in line 31 and it too is eventually reflected back with a reverse polarity. Note that capacitor 29 is a short to the pulses and serves only to block the D.C. voltage supplies. When the reflected pulse in line 31 returns to its point of origin it simultaneously starts up line 27 and triggers transistor 32 at the base thereof. Transistor 32 steers the return pulse from line 31 into the delay line 33 through which the pulse is then presented at the base of transistor 21. Transistor 21 is thereby once again triggered into conduction and a signal again appears on its collector. The length of line 33 is adjusted to make the appearance of the signal from transistor 21 at the collector thereof coincide with the return of the reflected pulse from line 27. Once transistor 21 is turned on the regenerative period begins again. Note that after the initial input trigger pulse, regeneration continues until stopped by the removal of the negative supply voltage at terminal 28.

The operation of the instant RPA may be more readily understood conceptually by picturing a pulse traveling back and forth from the shorted end of line 27 to the opposite shorted end of line 31. As this pulse returns from line 31 and is starting into line 27 a second pulse is initiated through delay line 33 which is timed to reinforce the pulse which returns from line 27. Thus now we have a pulse swinging back and forth in lines 27 and 31 with this pulse being reinforced each time it enters line 31 from line 27. To complete the picture note that each time the reinforcement occurs a third pulse is initiated in line 27 which is reflected therein and returns to cut off transistor 21. It is this third pulse which determines the duration which transistor 21 conducts and consequently the width of the RPA output pulse. It is apparent that a new RPA output pulse is started each time the ringing pulses starts into line 31 from line 27. Consequently, the repetition period T of the RPA is essentially equal to twice the delay time of delay line 27 plus delay line 31.

Looking now at the feedback circuit it becomes apparent that transistor 32 basically serves three functions. Its primary purpose is to originate a pulse in the feedback circuit at the time the ringing pulse is entering line 27 from line 31. This function, however, could easily be satisfied by a diode oriented in opposition to diode 34. But a diode would offer to the pulse from line 31 the impedance of delay line 33 which is the same as that of delay line 27. Consequently the pulse from delay line 31 would divide equally into lines 27 and 33 causing a voltage loss of one-half to the pulse carried into line 27. Additionally, the pulse introduced into line 33 would not have sufficient amplitude to be effectively transmitted therethrough to the base of transistor 21. Thus transistor 32 serves a second function of providing a relatively high input impedance as compared to that of line 27 whereby the ringing pulse suffers little loss upon entering line 27 from line 31. Now, as a third function, transistor 32 is employed as a Class C amplifier whereby it provides a large enough output pulse to properly drive line 33, while still affording the properties of a very good diode.

With regard now to the remaining components of the RPA circuit, it is seen that diode 34 serves to prevent the input trigger pulses from traveling into delay line 33. Resistor 24 is used to broadband the amplifier comprised of transistor 21 thereby decreasing its rise time. Unfortunately, however, increasing this emitter resistance also decreases the power handling capability of the amplifier stage. Consequently, the value of resistor 24 must be a compromise between the RPA pulse width and the number of cycles it takes for the regenerating pulse to reach full amplitude. Also, since the RPA output is taken from the emitter, resistor 24 should be of sufficient magnitude to provide a large enough pulse to drive the coincidence circuit of the vernier chronotron.

Figure 3:
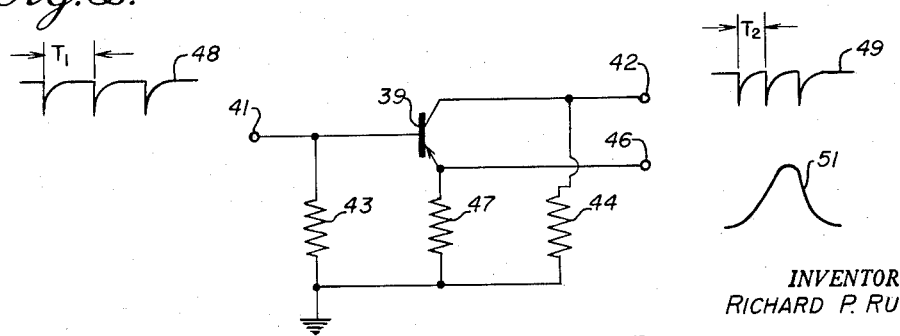
FIGURE 3 is a schematic diagram of a preferred embodiment of the instant coincidence circuit.

Referring now to FIGURE 3, there is shown an improved coincidence circuit as employed in the chronotron of FIGURE 1 and including a transistor 39 with its base connected directly to an input terminal 41. Another input terminal 42 is connected to the collector of transistor 39. The input terminal 41 is tied to ground through a resistor 43 while a resistor 44 connects input terminal 42 to ground. An output terminal 46 is connected directly to the emitter of transistor 39 with the emitter thereof tied to ground through a resistor 47. Terminals 41 and 42 receive similar input signals designated respectively by pulse chains 48 and 49 having respective periods $T_1$ and $T_2$. The output on terminal 46 is represented by pulse 51.

With regard now to the operation of the coincidence circuit of FIGURE 3 it is seen that a series of pulses with period $T_1$ is applied to the base of transistor 39 and another series having period $T_2$ is applied to the collector thereof. As the pulses are relatively low in amplitude a pulse on the base alone is not sufficient to conduct a current through the transistor in the absence of a collector voltage. However, when a base pulse and a collector pulse occur simultaneously at the transistor an appreciable coincidence peak is observed across the emitter resistor. Because of the transistor action of this circuit there is excellent discrimination against partial coincidence. Note that no power supply is needed for the operation of this coincidence circuit thereby certainly fulfilling the specification that there be no standby power drain.

The operation of the over all vernier chronotron shown in FIGURE 1 will now be readily understood upon considering the following analysis. Note that the RPA circuits in FIGURE 1 are typified by the circuit described in FIGURE 2, and that the coincidence circuit is of the type in FIGURE 3. Note also that a series of pulses is fed from RPA 11 into the coincidence circuit with these pulses having a period $T_1$. RPA 16 feeds a series of pulses of period $T_2$ into the coincidence circuit. In addition to feeding the coincidence circuit, the output of RPA 11 is used to start the counter 14. At the time of coincidence, the output of circuit 13 stops the counter.

Consider now that at a time $t_1$ a trigger pulse initiates RPA 11 into regeneration indicating the start of a time interval. At a time $T_2$ a trigger pulse indicating the end of the time interval starts RPA 16 regenerating. Assuming the periods $T_1$ and $T_2$ are not identical, the two series of pulses will coincide at some later time $t_c$. Now if $T_2$ is made smaller than $T_1$ the following equations are readily apparent, $$t_c - t_1 = nT_1 \quad (1)$$
$$t_c - t_1 = t_2 - t_1 + nT_2 \quad (2)$$

where $n$ is the number of regeneration periods for either RPA occurring after the respective trigger pulse and before coincidence. The quantity $(t_c - t_1)$ represents the time between the start of the time interval and coincidence. From these two equations it is easily seen that the actual time interval is given by, $$t_2 - t_1 = n(T_1 - T_2) \quad (3)$$

Since the counter counts the pulse from the RPA at the time or triggering and also the one at the time of coincidence it is seen that the number of pulses counted "$p$" determines "$n$" as follows $$n = p - 1 \quad (4)$$

As the output pulse from the coincidence circuit stops the counter from registering any subsequent RPA pulse, the number "$n$" is easily determined by reading the number "$p$" straight from the counter whereby the interval $t_2 - t_1$ is simply found from Equation 3.

Now as an example of chrontron use suppose that it is desired to measure time intervals in the range of 0–100 nanoseconds (ns.) with an accuracy of five ns. A first condition as set by the accuracy requirement is that $(T_2 - T_1)$ be equal to 5 ns. By using a 10 megacycle counter the problem is easily set up by letting $T_1 = 100$ ns., and $T_2 = 95$ ns. From Equations 1 and 2 it follows that $$t_c - t_1 = \frac{(t_2 - t_1) T_1}{(T_1 - T_2)} \quad (5)$$

Now, consider a time interval of 30 ns., that is, $(t_2 - t_1) = 30$ ns. Equation 5 shows that a coincidence output pulse at $t_c$ would occur 600 ns. after the first trigger pulse at $t_1$. This means that seven pulses would be counted, i.e., $p = 7$ and thus $n = 6$. Using this information in Equation 3 substantiates that the time interval measured was 30 ns.

It should be noted that previously mentioned considerations regarding the magnitude of resistor 24 in FIGURE 1 make it impossible to measure time intervals less than 15 ns. This limitation is due to device limitations, and exists because it takes three regeneration periods for the RPA output to reach full amplitude and thereby be sufficiently large to drive the coincidence circuit.

The following specifications are given to illustrate practicl RPA and coincidence circuits as based on the respective schematics of FIGURES 2 and 3.

| | |
|---|---|
| T21 | WE GF40021. |
| T32 | 2N501A. |
| C23 | 50 μμf. |
| C29 | .005 μf. |
| R37 | 220 ohms. |
| R24 | 27 ohms. |
| DL31 | 47 ns., 100 ohms. |
| DL27 | 3 ns., 100 ohms. |
| DL33 | 3 ns., 50 ohms. |
| D22 | Q6–100. |
| D34 | Q6–100. |
| T39 | 2N1195. |
| R43 | 27 ohms. |
| R47 | 150 ohms. |
| R44 | 27 ohms. |

An RPA circuit composed of these specified components biased at terminal 28 with minus eight volts and at terminal 36 with plus 0.15 volt operates as follows. A minimum trigger pulse of four volts at input terminal 18 is required to start regeneration. The regeneration period is 100 ns. with three periods needed to achieve full buildup. The effective width of the output pulse is about 6 ns. The coincidence circuit composed of the specified components is charcterized as follows. The pulses whose coincidence is to be determined are of relatively low amplitude, viz., from about 0.7 to 1.0 volt across the respective 27 ohm input resistances. When coincidence occurs an emitter output of a 0.5 volt pulse is observed.

It should be noted that the diagram of FIGURE 1 shows only one possible use of the basic vernier chronotron. Besides the illustrated system for direct time interval measurement, the vernier chronotron can be employed in time scaling systems and time-to-height converters. In a time scaling system the two trigger pulses indicating the time interval $(t_2 - t_1)$ are transformed into two new pulses separated by a much larger time duration. Time scaling can be accomplished by using the $t_1$ trigger pulse to feed into an adder and also to have the coincidence output feed the adder. The adder output will then be two pulses separated by some scaled time interval of $k(t_2 - t_1)$. The time-to-height utility of the chronotron is important where the $(t_2 - t_1)$ trigger pulses are too close to be applied to an integrator having a slow time response. This problem is solved by using the $t_1$ trigger pulse to set a set-reset type flip-flop. The coincidence circuit output is then used to reset the flip-flop. The output from the flip-flop is consequently a pulse long enough in duration to be successfully applied to an integrator from which the appropriate height pulse is formed.

While the invention has been described above in connection with various specific embodiments, it is to be understood that this description is made only by way of example and that numerous other arrangements may be devised by those skilled in the art without departing from the spirit and scope of the invention. It is therefore intended that the present invention be limited only as indicated by the scope of the following claims.

What is claimed is:

1. In a vernier chronotron, the combination comprising, a coincidence circuit having two inputs, a first regenerative pulse amplifier coupled at its output terminal into one of said coincidence circuit inputs, and a second regenerative pulse amplifier coupled at its output terminal into the second of said coincidence circuit inputs; said first and second regenerative pulse amplifiers each comprising a delay line having reflective terminations at each end thereof, a transistor having a base, emitter, and collector connected at said collector to said delay line at a point thereof intermediate to said ends, a feedback circuit coupled from said collector to said base, said output terminal connected to said emitter, and power supply means coupled to said transistor for supplying operating bias thereto.

2. In a vernier chronotron, the combinnation comprising, a coincidence circuit; a first regenerative pulse amplifier coupled into said coincidence circuit; and a second regenerative pulse amplifier coupled into said coincidence circuit; said first and second regenerative pulse amplifiers each comprising a delay line having reflective terminations at each end thereof, a transistor having a base, emitter and collector connected at said collector to said delay line at a point thereof intermediate to said ends, a feedback circuit coupled from said collector to said base and power supply means coupled to said transistor; said coincidence circuit comprising a second transistor having a base, emitter and collector, a first input circuit coupled to the base of said second transistor and coupled in receiving relation to the transistor emitter of said first pulse amplifier, a second input circuit coupled to the collector of said second transistor and coupled in receiving relation to the transistor emitter of said second pulse amplifier, and an output circuit coupled to the emitter of said second transistor.

3. In a vernier chronotron, the combination comprising, a first transistor having a base, emitter and collector, a resistor connected between said base and ground, a resistor connected between said collector and ground, a resistor connected between said emitter and ground, a second transistor having a base, emitter and collector connected at its emitter to said base of said first transistor, a delay line having reflective terminations at both ends thereof connected at a point thereof intermediate to said ends to the collector of said second transistor, a feedback circuit connected between the collector and the base of said second transistor, a third transistor having a base, emitter and collector connected at its emitter to said collector of said first transistor, a second delay line having reflective terminations at both ends thereof connected at a point thereof intermediate to said ends to the collector of said third transistor, a second feedback circuit connected between the collector and the base of said second transistor, an output terminal connected to the emitter of said first transistor, and power supply means coupled to said second and third transistors for supplying operating bias thereto.

4. In a regenerative pulse amplifier, the combination comprising, a double ended delay line having reflective terminations at each end thereof and divided at at a station intermediate its ends into two moieties of delay line connected together at the resulting gap in contiguous, series relationship by a pulse-conductive link, an amplifier stage coupled at its output into said link at said gap in delay line, a feedback circuit coupled from said amplifier stage output at said link in the same aforesaid gap in delay line to the input of said amplifier stage, and an input triggering circuit coupled into said amplifier stage.

5. In a regenerative pulse amplifier, the combination comprising, a first delay line having one end thereof terminated in a short circuit, a second delay line having one end thereof terminated in a short circuit coupled at its remaining end through a capacitor to said first delay line at the remaining end thereof, a transistor having a base, emitter and collector coupled at its collector to said first delay line at the end thereof adjacent to said capacitor, a steering circuit coupled to said second delay line at the end thereof adjacent to said capacitor, a delay circuit coupled between said steering circuit and the base of said transistor, an input triggering circuit coupled to the base of said transistor, and power supply means coupled to said transistor for applying operating bias thereto.

6. In a regenerative pulse amplifier, the combination comprising, a delay line having reflective terminations at each end thereof, a transistor having a base, emitter and collector connected at its collector to said delay line at a point thereof intermediate to said ends, said transistor biased to conduct only upon the presence of a substantial impedance at said collector and upon the presentation of an initial trigger pulse at said base, a second transistor having a base, emitter and collector connected at said base to said collector of said first transistor, said second transistor biased to conduct only upon the presence at the base thereof of a pulse having the opposite polarity from the first transistor collector output, and a feedback delay line connected between the emitter of said second transistor and the base of said first transistor.

7. In a regenerative pulse amplifier, the combination comprising, a first transistor having a base, emitter and collector, a power supply coupled to said collector, a first coaxial delay line coupled at one end thereof to said collector and short circuited at its remaining end, a second coaxial delay line capacitively coupled at one end to said collector and short circuited at its remaining end, said second coaxial delay line grounded at its outer conductor, a second transistor having a base, emitter and collector coupled at its base to said second delay line at the end thereof coupled to said first transistor, a power supply coupled to the collector of said second transistor, a third coaxial delay line connected at one end thereof to the emitter of said second transistor, said third delay line grounded at its outer conductor, a diode connected between the remaining end of said third delay line and the base of said first transistor, said diode oriented to block positive current from said third delay line into said first transistor, a bias power supply means coupled to the base of said first transistor, an output terminal connected directly to the emitter of said first transistor, a resistor connected between said output terminal and ground, a capacitor connected to the base of said first transistor, a second diode connected to the remaining end of said capacitor, said second diode oriented to block positive current into said capacitor, and an input terminal connected to the remaining end of said diode.

References Cited in the file of this patent

UNITED STATES PATENTS

| 2,745,004 | Yu | May 8, 1956 |
| 2,830,179 | Stenning | Apr. 8, 1958 |
| 2,889,467 | Endres et al. | June 2, 1959 |
| 2,986,654 | Gunning | May 30, 1961 |

FOREIGN PATENTS

| 863,672 | Germany | Jan. 19, 1953 |